Figure 1:
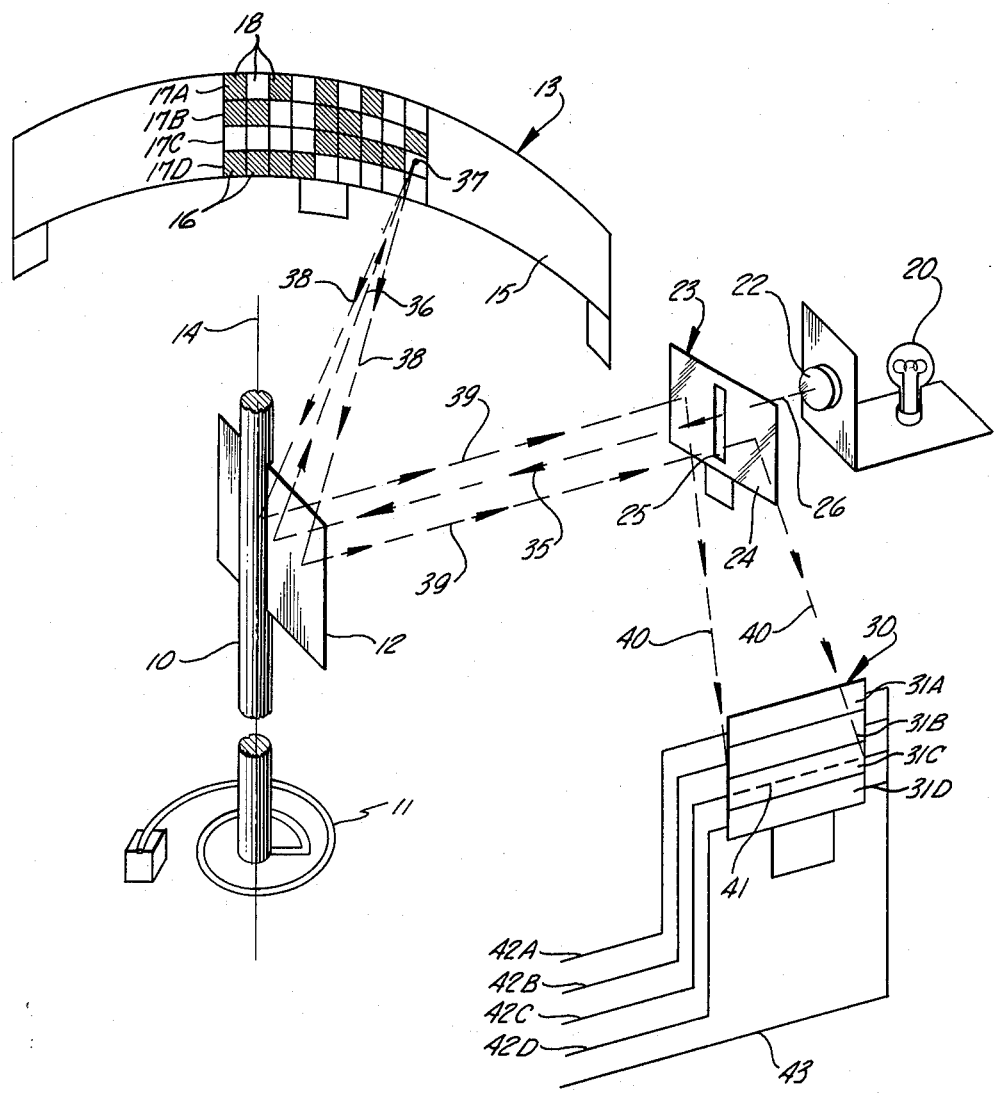

Jan. 25, 1966 S. F. HIGGINS 3,231,884
DIGITAL TRANSDUCER

Filed July 13, 1961 2 Sheets-Sheet 1

INVENTOR.
STERLING F. HIGGINS
BY
Christie, Parker & Hale
ATTORNEYS.

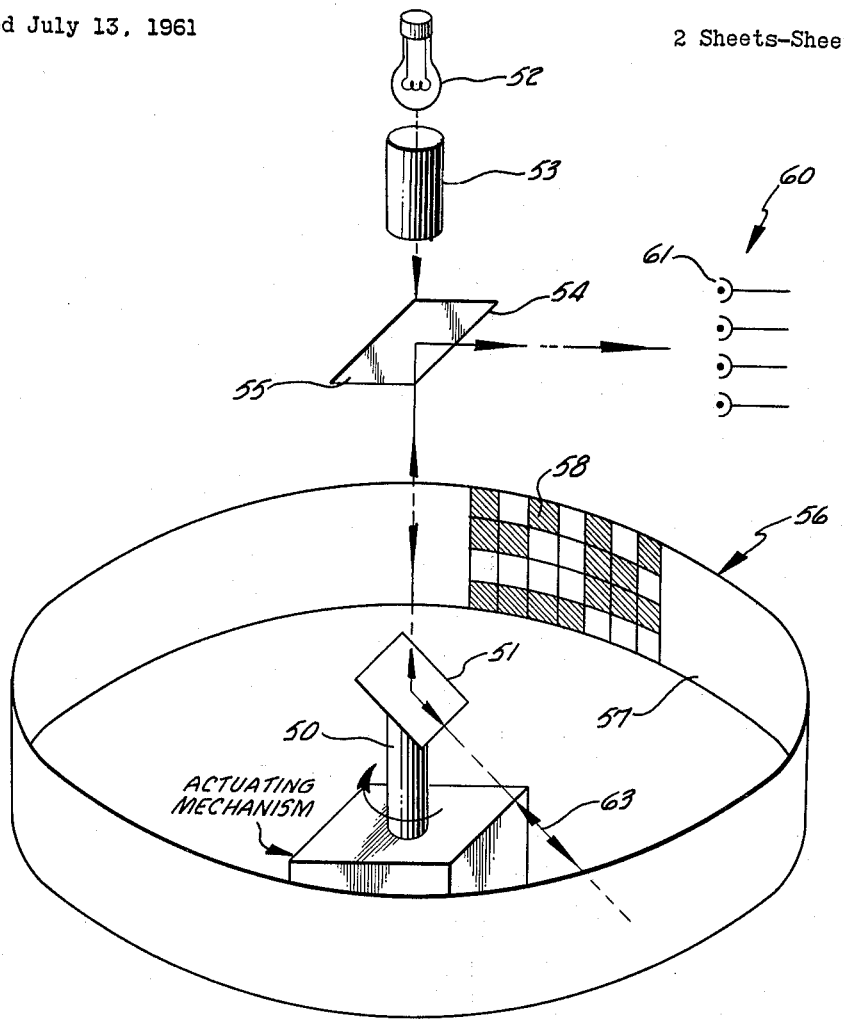

United States Patent Office 3,231,884
Patented Jan. 25, 1966

3,231,884
DIGITAL TRANSDUCER
Sterling F. Higgins, Los Angeles, Calif., assignor to Consolidated Electrodynamics Corporation, Pasadena, Calif., a corporation of California
Filed July 13, 1961, Ser. No. 123,815
3 Claims. (Cl. 340—347)

This invention relates to a data conversion apparatus. More particularly, it relates to an analog-to-digital converter producing an output in a digitally coded form.

Since a large percentage of data from data acquisition systems is now slated for digital computer reduction or manipulation, it is very convenient to have the information in a digital form as soon as possible. The ideal is a transducer having a digital output. This avoids the opportunity for mutilation and distortion of an analog function or voltage during subsequent handling prior to ultimate utilization.

For many years the instrumentation industry has sought to provide apparatus capable of accurate digital representation of an analog function. The problem is to provide a small, lightweight, and inexpensive mechanism which does not introduce inaccuracy to the analog function before or during conversion to a digital representation. Equipment available at the present time accomplishes digitization of analog data generally by means of apparatus which is attached to an analog function shaft. The drawback with such digitizers is that the mass added to the movement affects the response of the movement. Other digitizers prevent inertial sources of inaccuracy but do so through the use of bulky, expensive, and complicated equipment.

The present invention solves this problem and provides a small, lightweight, and inexpensive digitizer, which does not introduce inaccuracy to the analog function, by providing a unique combination of elements. Generally speaking, the data converter of this invention includes a mirror which is positioned in response to an input stimulus. A digitally coded reflective surface is spaced from the mirror. A light source is provided and directs light to the mirror for deflection to the coded reflective surface. Photoelectric converter output means are aligned so as to receive light proceeding along a path from the coded reflective surface via the mirror to the photoelectric output means. The converter output means are responsive to the coded pattern of the light reflected from the digitally coded reflective surface and provide correspondingly coded electrical signals which may be inserted directly into a digitally coded data-handing apparatus. The apparatus of this invention adds a negligible weight to a transducer movement so as to avoid hysteresis and inertial mutilation of the transducer analog function.

In the following discussion and description the analog-to-digital data converter of this invention is described as included in a rotary shaft transducer. This environment is solely exemplary and is not to be considered as a limitation of the scope of the invention. The converter may just as easily be used remote from the transducer, or it may be used without any transducer as in a shaft position encoder.

The following detailed description of the invention is made in conjunction with the accompanying drawings, wherein:

FIGURE 1 is a semi-schematic and isometric illustration of the main components of the invention according to one modification; and FIGURE 2 is a combined schematic and isometric representation of the components of a second modification of the invention providing digitalized data for a shaft rotatable through a full three hundred sixty degree (360°) arc.

Referring to FIGURE 1, a rotatable analog function shaft 10 of a data converter is provided in a transducer. The amount of rotation of the shaft 10 from a normal position is a function of the stimulus to which the transducer is subjected. The shaft 10 is rotatable by a Bourdon tube 11 fixed at the end away from shaft 10 and senses pressure. The shaft 10 may be connected to a seismic mass if the transducer is an accelerometer. A small and lightweight mirror 12 is fastened securely parallel to the shaft 10 with its reflector surface on the axis of the shaft 10. A cylindrical reflector 13 is spaced from the shaft 10 on support blocks and is concentric to the axis 14 of the shaft with the reflectorized surface 15 of the cylinder 13 oriented toward the shaft 10. (It is noted that a cylinder need not necessarily be circular.) The reflectorized surface 15 of the cylindrical mirror 13 has thereon portions 16 which are nonreflective. These nonreflective portions 16 are arranged so that vertical elements of the cylinder 13 provide digitally coded sequential representations of shaft position. As illustrated in FIGURE 1, there are four rows 17A, 17B, 17C, and 17D of locations for the nonreflecting portions 16 circumferentially around the interior of the mirror 13. A plurality of columns 18 for the nonreflecting portions 16 are provided longitudinally of the cylinder 13 parallel to the shaft 10. The combination of the rows 17 and columns 18 provides discrete areas of the reflecting surface 15, predetermined ones of which are blacked out or made nonreflective, as by photoetching, in accord with a predetermined pattern corresponding to a digital information sequence. As illustrated in FIGURE 1, the columns 18 provide digital words comprised of four (4) bits, the blacked-out portion 16 of each word corresponding to a digital null or zero. While only four bits are illustrated in each word or column 18 on the mirror 13, it is to be understood that this is by way of example only and that the number of bits ($n$) in each column may be determined in accord with the requirements of any given transducer.

A light source 20 is provided in conjunction with a focusing system of lenses 22. A mirror 23 having its reflectorized surface 24 oriented toward the shaft 10 is provided adjacent one end of the cylindrical mirror 13. The mirror 23 has a narrow unsilvered area 25 arranged parallel to the axis 14 of the analog function shaft 10 and acts as a collimator for the light beam 26 emanating from the lens system 22.

Photosensitive means 30 are located adjacent the collimating mirror 23. Phototransistors are preferable for the photosensitive means; however any apparatus fulfilling the requirements of the apparatus according to this invention may be utilized. The overall photosensitive means 30 includes a phototransistor 31A to 31D arranged horizontally corresponding to the rows 17A to 17D on the cylindrical mirror 13. Four phototransistors 31A to 31D are illustrated; however the proper practice of this invention requires as many phototransistors 31 as there are bits ($n$) in each digital word on the mirror 13. If ($n$) bits appear in a word on the reflectorized surface 15 of the cylindrical mirror 13, then ($n$) photosensitive means are provided at 30.

The light beam 26 from the focusing lenses 22 proceeds through the collimating mirror 23 along the path 35 to the shaft-mounted mirror 12. The mirror 12 reflects the collimated beam to the reflectorized surface 15 of the cylindrical mirror along path 36. If the collimated path 36 strikes a point 37 on the mirror 13 which has not been rendered nonreflective by an area 16, the light incident on the mirror 13 is reflected back to the mirror 12 along path 38 and then to the reflecting surface 24 of mirror 23 along path 39. The mirror 23 is oriented at an angle such that the light of path 39 is reflected towards the photosensitive means 30 along light path 40. The light reflected from the mirror 23 strikes the phototransistor corresponding to the row in which point 37 lies, in this case phototransistor 31C, as represented by the dotted line 41. A change of electrical state is registered in output conductor 42C as the phototransistor 31C is rendered conductive to a potential impressed on the bank of transistors 30 by photosensitive means charging conductor 43. In the apparatus described above, the lens system 22 may incorporate the collimating apparatus for the light beam 35. Mirror 23 need not necessarily be of the slitted type but may be of the partially silvered type allowing light to pass through it in one direction and reflecting light incident upon it from the other direction.

In the apparatus described above, the light source 20, the mirrors 12, 13 and 23, and the photosensitive means 30 lie in substantially the same plane, which plane, for the purposes of illustration, is shown to be a horizontal plane. Because of this configuration, the arc available for interception by the light beam 36 on mirror 13 is limited. Since the shaft 10 is activated by a Bourdon tube mechanism 11, the angle through which the shaft 10 rotates is small and the mirror 13 can practically sublend an arc satisfactory to accommodate all angular displacements of the shaft 10. The result of the above-described apparatus is that each discrete position, according to a predetermined standard, of the shaft 10 and the mirror 12 may be assigned a numerical value. This numerical value may then be represented by the digital coding provided by proper orientation of the nonreflecting areas 16 on the mirror 13. For any given position of the mirror 12, the light from the source 20 sweeps all of the bits in any given word or column 18 on the mirror 13. This is reflected via the mirror 12 and the mirror 23 to the photosensitive transducer output means 30 for immediate reading from the transducer. Because the digital information represented by the coding on the mirror 13 is available at the transducer output 30 in digital form, the conductors 42A to 42D may be utilized directly as inputs to a data handling apparatus (not shown), such as a memory bank or some operational stage of a data processor.

One advantage of the configuration illustrated in FIGURE 1 and described above is that the arc of the mirror 13 swept by a reflected beam 36 is twice the arc or angle of the rotation of the shaft 10. The digital code on the mirror 13 may be arranged to provide very high precision for the analog function represented by rotation of the shaft 10. The radial distance between the shaft 10 and the mirror 13 can also be considered a variable in determining the degree of precision required by the digital transducer.

A limitation of the configuration illustrated in FIGURE 1 is that the mirror 13 will not provide a surface for digital coding which is operable if the shaft 10 rotates through an arc greater than one-half the arc of the mirror 13. The apparatus illustrated in FIGURE 2 provides for digital code representation on a mirror and yet provides an apparatus which is operable through a 360° rotation of the analog function shaft 50. A mirror 51 is mounted to the free end of the analog function shaft 50 driven by a mechanism shown generally as an actuating mechanism. The mirror 51 preferably is oriented at a 45° angle to the axis of the shaft 50. A light source 52 and a light-focusing and collimating lens assembly 53 are located coaxially of the shaft 50 and are spaced from the mirror 51. A partially silvered mirror 54 having its reflective surface 55 oriented toward the shaft-mounted mirror 51 is interposed between the collimating apparatus 53 and the mirror 51. A cylindrical mirror 56 having a reflectorized interior surface 57 is oriented perpendicular to and coaxial with the shaft 50 coplanar with the shaft-mounted mirror 51. The reflectorized surface 57 of the mirror 56 incorporates nonreflecting areas 58 which are arranged to provide digitally coded words having ($n$) bits as described in conjunction with FIGURE 1. A bank 60 of ($n$) photosensing elements 61 is provided adjacent the fixed partially silvered mirror 54. It is necessary that the partially silvered mirror 54 be oriented such that light reflected from the reflectorized surface 57 via the shaft-mounted mirror 51 be reflected to the photosensitive bank 60. Because the output mirror 54 is fixed coaxially with the analog function shaft 50, the light reflected by the mirror 51 will always be intercepted by the mirror 54 for direction to the photosensitive transducer output means 61. The orientation of the mirror 51 relative to the shaft 50 is such that light rays from the mirror 56 to the mirror 51 are reflected coaxially of the function shaft 50.

In the modification of the invention illustrated in FIGURE 2, the arc of the mirror 56 swept by light beam 63 from mirror 51 corresponds to the amount of rotation of the shaft 50. In this modification, then, as compared with the modification illustrated in FIGURE 1, for any given radius between the analog function shaft and the coded mirror, the precision of the transducer is reduced one-half. However, the advantage of the second modification is that the shaft 50 is rotatable through a full 360° without the reflected light beam sweeping past the end of the coded reflector.

In the figures used in conjunction with the above description, the digital coding on the cylindrical mirrors 13 and 56 is illustrated to be a binary code. However, it is within the scope of this invention that a Gray or cyclic permutating code may be utilized. Also, the coding may be decimal if such is practical for the particular application of the transducer of this invention.

A particular advantage of this invention is that the mass of the rotary parts of the transducer is kept to a minimum since only the scanning mirror 51 is mounted to the analog function shaft. By this expedient, the inertia of the rotating mass is kept to a minimum so that the response of the transducer is not reduced by utilization with the digitalizing apparatus described above. Further, the coded scales on the mirrors 13 and 56 may be adapted for any given application of the transducer. If, at a later date the transducer is utilized to sense a different input phenomenon or stimulus, the coded mirror may be replaced with another carrying a different digital scale thereon to correspond to the new application of the transducer.

While the foregoing discussion and description of the invention has been made in conjunction with a specific environment and with specific apparatus, it is to be understood that this has been by way of example only and not as a limitation to the scope of this invention.

I claim:

1. A digital transducer including analog-to-digital data conversion means comprising a shaft having rotation as the analog function to be digitalized, a mirror mounted on and parallel to the shaft, a cylindrical reflective surface concentric to the shaft in a plane perpendicular to the shaft, a light source directed toward the shaft mirror, means in the plane for collimating the light before incidence on the shaft mirror, photoelectric output means from the transducer, and means in the plane between the mirror and the light source for directing light to the photoelectric output means, wherein the concentric reflective surface has nonreflective portions arranged to provide multi-bit words in a sequential digital code indicative of discrete values of transducer input and corresponding to the language of a digital data processing system to which the photoelectric output means is connectable, and wherein the light path from the light source is to the shaft mirror, to the digitally coded concentric reflective surface, back to the shaft mirror, to the light directing means and ultimately to the photoelectric output means, the photoelectric output means providing a digitally coded electrical signal indicative of the analog function.

2. A digital transducer including analog-to-digital data conversion means comprising a shaft having rotation as the analog function to be digitalized, a mirror mounted on the end of the shaft at an angle thereto, a cylindrical reflective surface concentric to the shaft, a light source coaxial with the shaft and directed toward the mirror, means for collimating the light before incidence on the shaft mirror, a plurality of photoelectric output means from the transducer, and means coaxial with the shaft for directing reflected light to the photoelectric output means, wherein the concentric reflective surface has nonreflective portions arranged to provide multi-bit words in a sequential digital code indicative of discrete values of transducer input and corresponding to the language of a digital data processing system to which the photoelectric output means is connectable, there being the same number of bits in each word as there are photoelectric means in said plurality, and wherein the light path from the light source is to the shaft mirror, to the digitally coded concentric reflective surface, back to the shaft mirror, to the light directing means, and to the photoelectric output means so that those ones of said photoelectric output means are illuminated as correspond to illuminated reflective portions of said reflective surface, the photoelectric output means providing a digitally coded electrical signal indicative of the analog function.

3. A digital transducer including analog-to-digital data conversion means comprising a shaft having rotation as the analog function to be digitalized, a mirror mounted on the shaft for movement in response to shaft rotation, a cylindrical reflective surface disposed concentric to the shaft, a light source emitting a beam of light, means for collimating the light beam and for directing the collimated light beam to the shaft mirror, a plurality of photoelectric output means from the transducer, and means between the shaft mirror and the light source for directing light reflected thereto from the shaft mirror to the photoelectric output means, wherein the reflective surface has nonreflective portions arranged to provide multi-bit words in a sequential digital code indicative of discrete values of the analog function and corresponding to the language of a digital data processing system to which the photoelectric output means is connectible, there being the same number of bits in each word as there are photoelectric means in said plurality, and wherein the light path from the light source is to the shaft mirror, to the digitally coded reflective surface for illuminating a discrete area thereof, back to the shaft mirror, to the light directing means, and to the photoelectric output means so that those ones of said photoelectric output means are illuminated as correspond to illuminated reflective portions of said reflective surface in said discrete area, the photoelectric output means providing a digitally coded electrical signal indicative of the value of the analog function.

References Cited by the Examiner

UNITED STATES PATENTS

| 2,471,788 | 5/1949 | Snyder et al. | 340—347 |
| 2,834,005 | 5/1958 | Ketledge | 340—347 |
| 2,948,890 | 8/1960 | Barth | 340—347 |
| 2,994,863 | 8/1961 | Trapnell | 340—347 |

MALCOLM A. MORRISON, *Primary Examiner.*